F. G. BEASLEY.
REGULATOR FOR RECORDING GAS CALORIMETERS AND ANALOGOUS INSTRUMENTS.
APPLICATION FILED SEPT. 23, 1909.
985,722.
Patented Feb. 28, 1911.
4 SHEETS—SHEET 1.
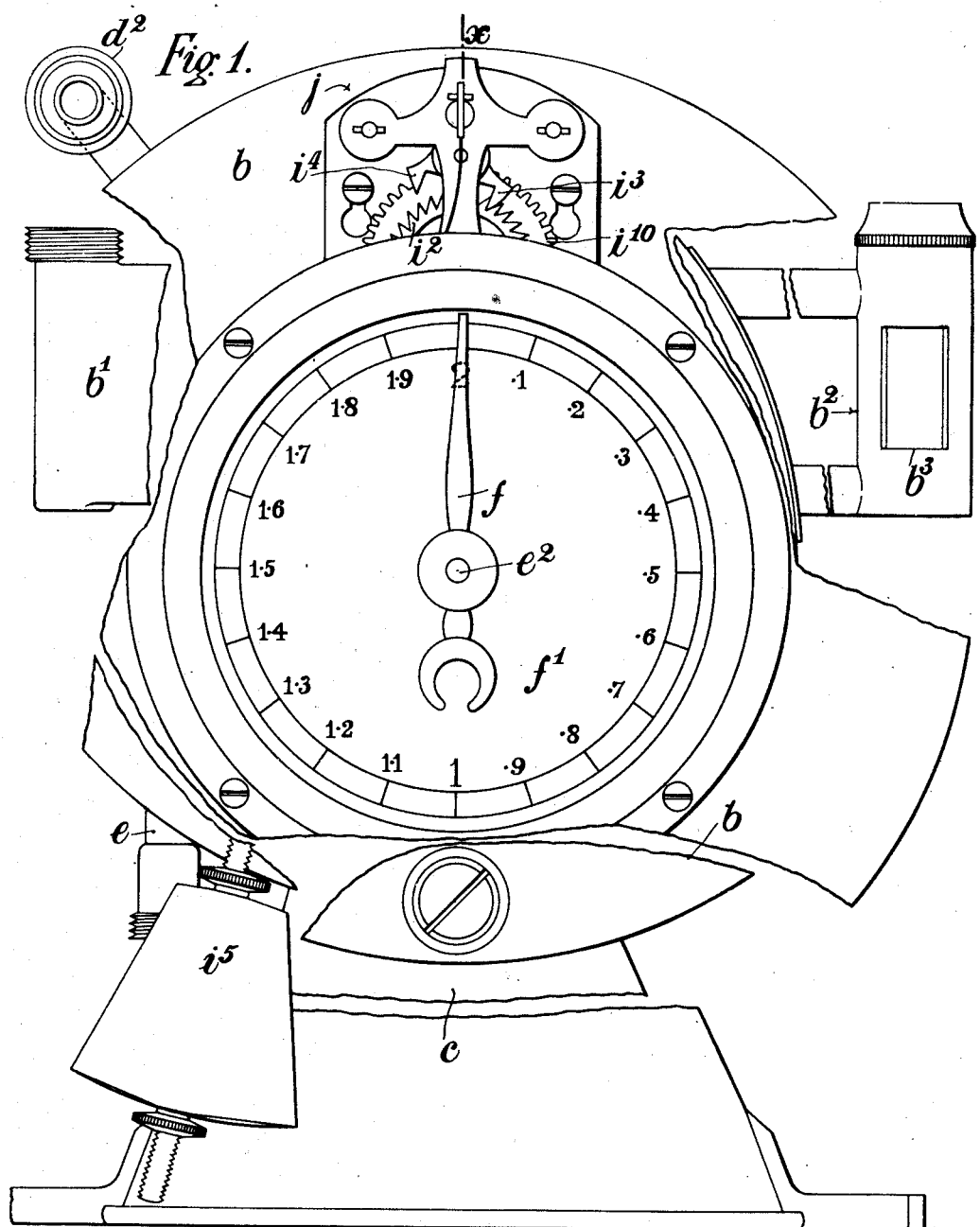
WITNESSES
INVENTOR
Fredric G. Beasley
By James L. Norris.

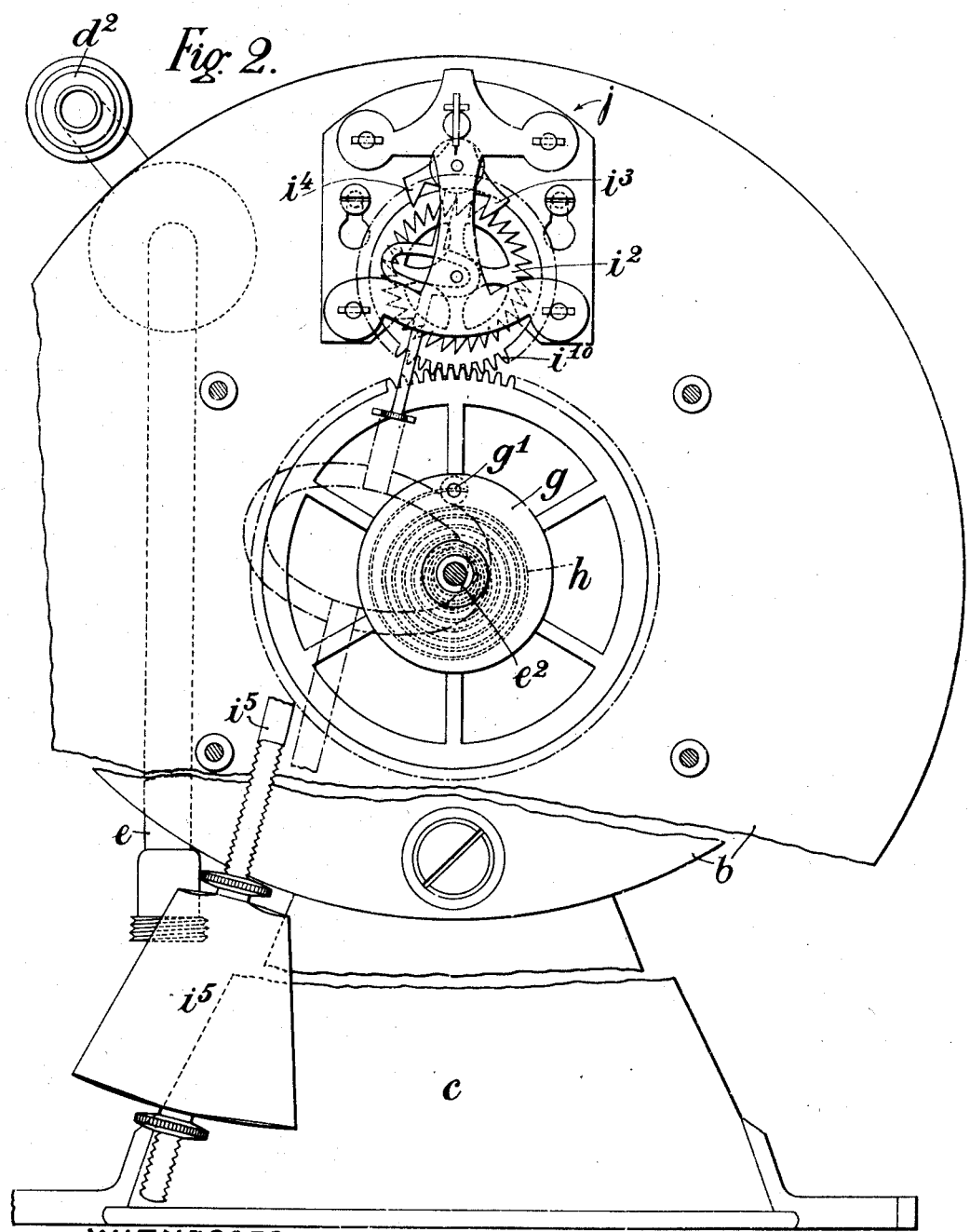

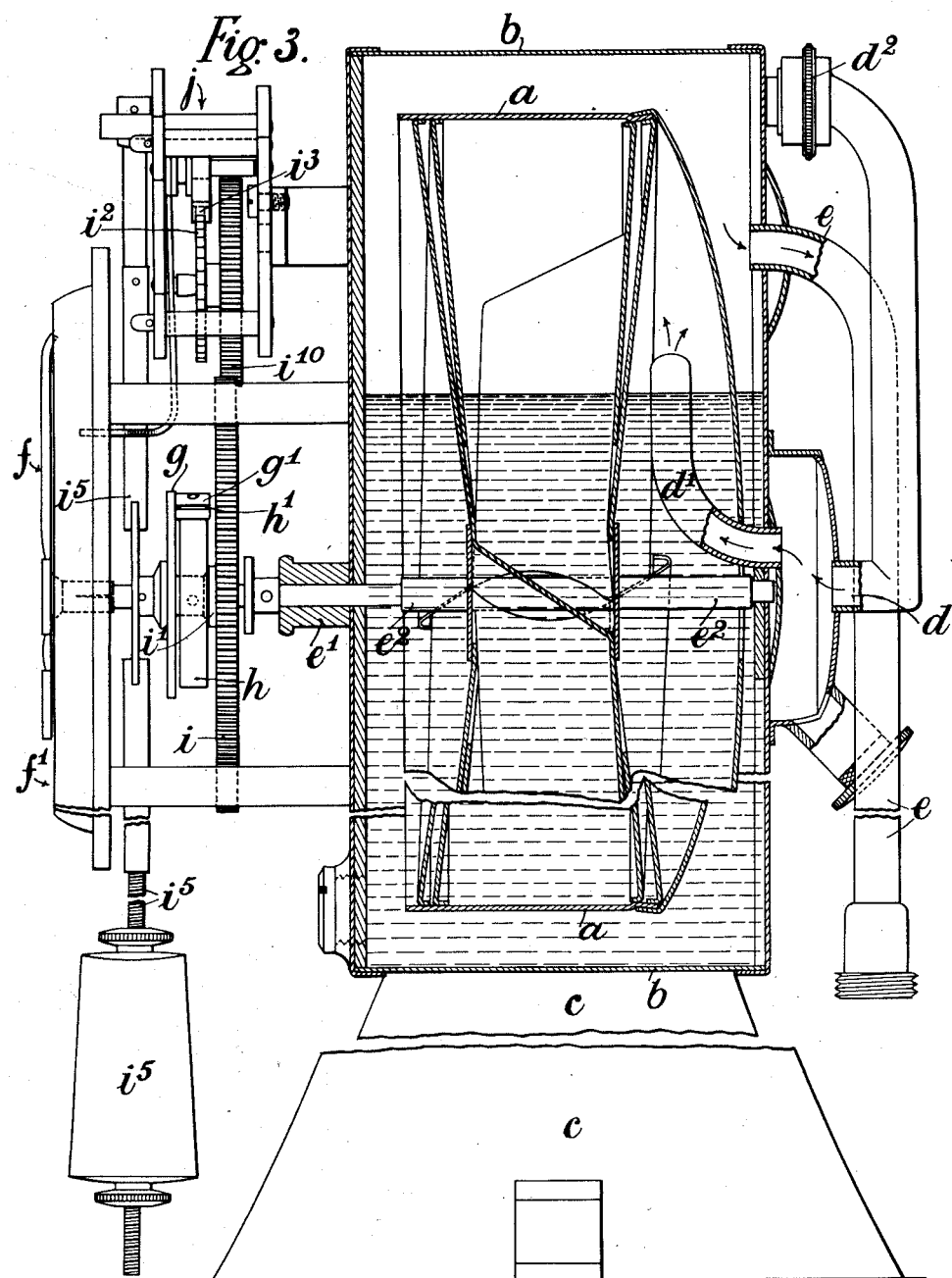

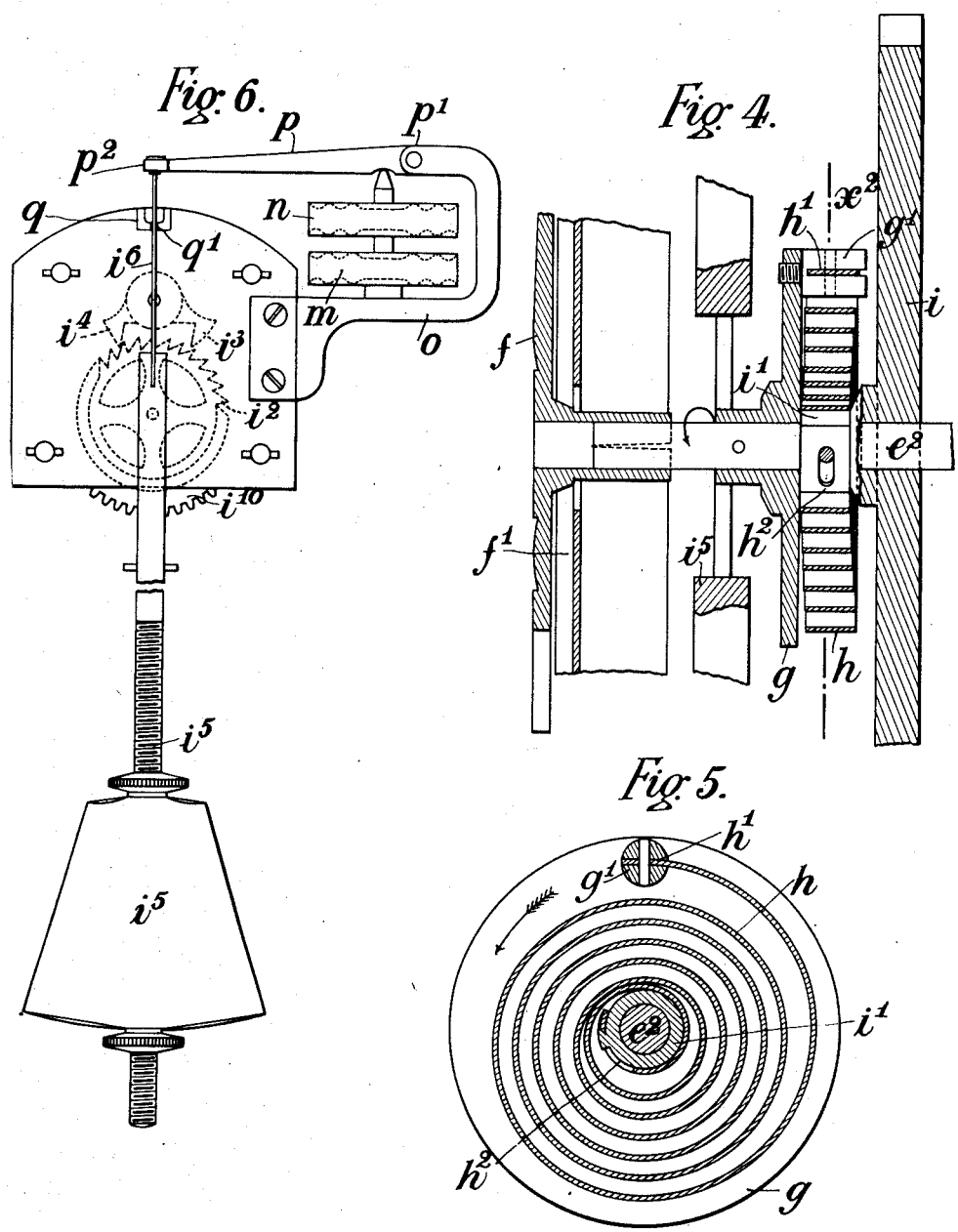

UNITED STATES PATENT OFFICE.

FREDRIC GEORGE BEASLEY, OF SMETHWICK, NEAR BIRMINGHAM, ENGLAND, ASSIGNOR OF ONE-HALF TO PARKINSON AND W. & B. COWAN LIMITED, OF BIRMINGHAM, ENGLAND.

REGULATOR FOR RECORDING GAS-CALORIMETERS AND ANALOGOUS INSTRUMENTS.

985,722.   Specification of Letters Patent.   Patented Feb. 28, 1911.

Application filed September 23, 1909. Serial No. 519,191.

*To all whom it may concern:*

Be it known that I, FREDRIC GEORGE BEASLEY, a subject of the King of Great Britain, residing at 44 Green street, Smethwick, near Birmingham, England, have invented certain new and useful Improvements in Regulators for Recording Gas-Calorimeters and Analogous Instruments, of which the following is a specification.

This invention has relation to means for supplying gas to registering gas calorimeters and certain other instruments for standardizing, testing and other scientific purposes, where it is essential for the supply to be absolutely constant and invariable in quantity. For instance, to enable the calorific value of a given gas to be ascertained with exactitude by a recording calorimeter, it is essential that an invariable unit quantity (or weight) of the gas should be delivered to the instrument in a given unit time, irrespective of variations in temperature and barometric pressure or other disturbing factors, and the principal object of the invention is to provide a gas-controlling or regulating appliance whereby this result may be attained. The said gas-controller, which is adapted to be interposed between a suitable sensitive pressure-governor connected with the main gas supply and the calorimeter or other instrument, comprises a drum (similar to that of an ordinary wet gas-meter) which is inclosed within a suitable casing and is driven or rotated by the pressure of the gas. This drum is of a capacity suitable for delivering a predetermined number of cubic feet or other volumetric units of gas per hour when turning at a certain number of revolutions per hour, and is connected with the regulating or controlling mechanism hereinafter described, which insures that the same shall pass the metered gas either in constant volume of gas per time unit under all conditions of temperature and barometric pressure, or in absolutely uniform quantity per time unit, irrespective of any slight variations in the pressure of the gas supplied through the governor, or of any changes in the density, temperature, or other physical condition of the gas, or of any slight obstruction from tar or other deposits in the pipes on the delivery side, or other causes.

The governing or controlling of the measuring and delivering drum, as regards the passing of an invariable unit (volume or quantity, as the case may be) in a given unit time, is effected by connecting or gearing the said drum (which is driven or rotated only by the pressure of the gas) to a pendulum or balance-wheel and escapement mechanism, and in the case of a pendulum escapement, and when it is desired to deliver constant quantity per time unit as distinct from constant volume, provision may be made for automatically altering the swing of the pendulum and consequently the rate of the delivery rotation of the drum in order to compensate for variations in the density and volume of the gas under the variations in barometric pressure and temperature. And further, in order to counteract any intermittency or unsteadiness such as would occur as the consequence of the alternating engagements and disengagements of the escapement pallets and escape wheel if the drum were geared directly or rigidly on the controlling mechanism, the connection between the drum spindle and the first wheel of the escapement gear train is made through a spring or equivalent flexible device which is tensioned by the initial movement of the drum and supplies the motive force for driving the escapement under control of the pendulum and also admits of the drum continuing to rotate steadily during the instant that the gear train is momentarily arrested by the engagement of an escapement pallet with the escape wheel which said rotation of the drum is transmitted to the spring and utilized for keeping the said spring at the proper tension for maintaining a steady impulse on the escape gear, as well as a steady controlling resistance to the rotation of the drum under the driving pressure of the gas.

In the accompanying drawings, Figures 1 to 5 show a controlling instrument or appliance constructed in accordance with one form of the invention and particularly adapted for delivering a constant volume of gas per unit time under all conditions of barometric pressure and temperature while Fig. 6 shows an arrangement that may be applied to automatically compensate for pressure and temperature variations and keep the quantity of gas delivered per unit time constant. Thus Fig. 1 represents a front elevation of the instrument or appliance designed for use in connection with a calorimeter, and shows how both the pendulum escapement mechanism and an indicating scale or dial are mounted on the front of the casing which incloses the gas-driven measuring drum. Fig. 2 is another elevation of the instrument, but the indicating dial is removed to show more clearly the disposition and construction of the governing escapement and of the spring connection between the escapement train and the spindle of the gas-driven drum. Fig. 3 is a view in which the casing and measuring drum of the instrument are shown in section, on the dotted line $x$ Fig. 1, as well as the gas supply and delivery pipes and their connections, while the escapement gear, the pendulum, the indicating dial and pointer are represented in side elevation. Fig. 4 represents, upon an enlarged scale, and partly in section and partly in elevation, the arrangement of the spring connection between the measuring-drum spindle and the first wheel of the governing escapement gear train: also the connection between the said drum spindle and the indicating pointer. Fig. 5 is a transverse section of Fig. 4, taken through the spring upon the dotted line $x^2$. This view shows how one end of the said spring is secured to a driving plate which is a fixture on the drum spindle while its other end is fixed or anchored to the hub of the gear wheel. Fig. 6 is a detail elevational view showing an arrangement, in coöperation with the pendulum and escapement mechanism, for automatically compensating for pressure and temperature variations, in order that the quantity of gas delivered per unit time may be kept constant.

The same letters of reference indicate corresponding parts in the several figures of the drawings.

The measuring part of the instrument comprises a wet-type gas-meter drum $a$, inclosed within a cylindrical casing $b$ which is mounted on a stand or base $c$ and has inlet or supply pipes $d$, $d^1$ for conveying the incoming gas into the drum and an outlet pipe $e$ whereby the measured gas is delivered to the calorimeter. Usually, when the instrument is being used to regulate the delivery of gas to a registering calorimeter, the supply pipe $d$ is connected by the union $d^2$ with a sensitive pressure governor of any suitable type, which maintains the gas admitted through the pipe $d$ at a given constant pressure so that the mechanism has only to control and keep constant volume per time unit. The casing is also provided, on the one side, with an extension $b^1$ for the attachment of a thermometer and on the other side with a water-level gage $b^2$ having a glazed opening $b^3$ wherethrough the level of the water in the casing can be observed. The drum $a$ is rigidly mounted on a spindle $e^2$ which turns in bearings in the walls of the casing and is extended through a gland $e^1$ in the front of the said casing to the outside thereof, where it is connected with a pointer $f$ which traverses a suitably graduated indicating scale on the face of a dial $f^1$, and facilitates the taking of readings from the instrument.

The instrument can be calibrated so as to deliver any desired volumetric unit in any desired unit time according to the particular use or service for which the same may be required.

At the back of the dial, the spindle has pinned or otherwise made fast to it, a plate or disk $g$ to which there is anchored at $g^1$ the outer end $h^1$ of a light volute spring $h$, whose inner end $h^2$ is secured to the hub $i^1$ of a large gear wheel $i$ that is loosely mounted on the said spindle. This wheel $i$ is the first element of the driving train of a pendulum escapement mechanism $j$ which is mounted on the front of the casing of the instrument and comprises a second gear wheel $i^{10}$, an escape wheel $i^2$, the anchor pallets $i^3$, $i^4$ and a pendulum $i^5$ whose rate of oscillation determines and keeps uniform the time factor in the delivery of the predetermined unit volume in unit time by the instrument; the volumetric factor being determined by the measuring chambers of the drum.

In using the instrument, gas is admitted into the drum before the pendulum is started and the said drum, with its spindle and the anchor plate $g$ are thereby caused to rotate through a sufficient distance in the clock-wise direction indicated by the arrows in Figs. 4 and 5 for winding up the spring $h$ to an appropriate tension, after which the pendulum is put in motion. Or if the instrument has been previously used and stopped with the spring in tension, it is sufficient to start the pendulum simultaneously with the admission of gas to the drum. The passage of gas through the instrument then proceeds and is kept absolutely uniform by the continuous rotation of the gas-driven measuring drum under the time control of the pendulum and escapement mechanism while the spring between the drum and the escapement both imparts a steady driving impulse to the gear wheels in the one direction and imposes, in the other direction, the controlling effect of the escapement upon the measuring drum in the form of a steady spring resistance to the primary driving effort of the gas. Further, the spring permits the drum to continue its delivering rotation during the moments that the escapement gear is held stationary by the engaging pallets which insures that the said delivery shall be continuous and steady in character as well as uniform in volume per time unit and also provides for the spring being automatically maintained at the proper working tension so long as the instrument is in use. That is to say, at the instant when the escapement train is held stationary by the engagement of an escapement pallet, the drum is not arrested in unison, but is still driven forward by the gas and acts to further tension the spring connection which momentarily stores up the power transmitted to it and gives the same out to the pendulum-controlled train as each pallet, in turn, leaves the escape wheel.

Any other suitable form or construction of pendulum or balance gear may be used instead of that represented in the drawings, and it may be connected up with the gas-driven measuring drum in any convenient manner or by any suitable gearing. Any equivalent spring arrangement may be used for connecting the drum with the escapement instead of the torsion spring connection above described.

In order to correct or automatically compensate for the effects of temperature (air temperature) and barometric pressure upon the gas, the pendulum of the controlling mechanism may be connected with an aneroid, whose variations are transmitted to the said pendulum, and made to alter its swing according to the variations in the temperature and pressure conditions, so that the pendulum-controlled measuring drum may be driven by the gas at a proportionally higher or lower speed and so deliver a greater or less volumetric measure of gas per time unit as its density varies with temperature and pressure.

Fig. 6 shows, diagrammatically, one arrangement such as may be applied to the machine already described, to correct the same to temperature and pressure. In this diagram $m$ and $n$ indicate two aneroids, the former being an exhausted barometric aneroid, while the latter is a temperature aneroid, filled with oil in a known manner. These aneroids may conveniently be mounted on a bracket $o$ such as shown on the side of the escapement gear frame. The aneroid diaphragms may be connected as shown so that the sum of their respective movements in response to temperature and pressure variations is transmitted to a multiplying lever $p$, whose short arm is pivoted to the bracket at $p^1$, while the other arm is attached at $p^2$ to the suspension spring $i^5$ of the pendulum $i^5$ pertaining to the drum-controlling escapement gear. The spring is arranged to pass through a slot $q^1$ in a bracket $q$ or similar fixed part, so that only the part of the said spring which comes below the bracket can swing. Thus the movements of the lever in response to the aneroids raise or lower the pendulum relative to the stationary bracket and change the effective length and swing of the pendulum, so that when the gas density falls under the net effect of prevailing temperature and pressure and the quantity per measured volume diminishes, the compensating device acts to lift the lever and pendulum so that the swing of the latter is shortened with the result that the action of the controlling escapement and the rotation of the gas-driven measuring drum are accelerated and a proportionally greater volume of gas per time unit is passed through and delivered to the calorimeter or the like. On the other hand, when the conditions are such as to increase the density of the gas, the resulting displacement of the lever by the aneroids lengthens the pendulum, slows the escapement and drum and proportionally reduces the volume per time unit. Any other aneroid-controlled compensating arrangement may be used for accelerating and retarding the action of the controlling mechanism and the rotation of the drum.

Having now fully described our invention we declare that what we claim is:—

1. A gas delivering instrument comprising a gas driven measuring drum, an escapement mechanism for determining the speed of rotation of said drum, and a spring interposed as a mechanical connection between the drum and the escapement mechanism.

2. A gas delivering instrument comprising an inclosed gas driven measuring drum, an escapement mechanism, gearing for the mechanism, a pendulum associated with the escapement mechanism, and a spring connecting the drum spindle and an element of the gearing.

3. A gas delivering instrument comprising a gas driven measuring device, means for causing the measuring device to have a determined rate of movement, and means for varying the rate of movement of the measuring device from the rate determined in accordance with barometric pressure and temperature variations from the normal.

4. A gas delivering instrument comprising a gas driven measuring drum, means for causing the drum to have a determined speed of rotation, and an aneroid arrangement coöperating with the means to automatically vary the speed of the drum, from the speed determined, in accordance with barometric pressure and temperature variations from the normal.

5. A gas delivering instrument comprising an inclosed gas driven measuring drum, an escapement mechanism, gearing connecting the mechanism and the drum spindle, a pendulum associated with the mechanism, and an aneroid arrangement for varying the speed of oscillation of the pendulum in accordance with variations of barometric pressure and of temperature.

In testimony whereof I have hereunto set my hand in presence of two subscribing witnesses.

FREDRIC GEORGE BEASLEY.

Witnesses:
HENRY L. KERRETT,
HENRY NORTON KERRETT.